(12) United States Patent
Choi et al.

(10) Patent No.: US 7,791,543 B2
(45) Date of Patent: *Sep. 7, 2010

(54) ANTENNA FOR RADIO FREQUENCY IDENTIFICATION TAG

(75) Inventors: Won Kyu Choi, Daejeon (KR); Jeong Seok Kim, Daejeon (KR); Gil Young Choi, Daejeon (KR); Cheol Sig Pyo, Daejeon (KR); Jong-suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 187 days.

This patent is subject to a terminal disclaimer.

(21) Appl. No.: 12/126,020

(22) Filed: May 23, 2008

(65) Prior Publication Data
US 2009/0096678 A1 Apr. 16, 2009

(30) Foreign Application Priority Data
Oct. 10, 2007 (KR) ........................ 10-2007-0102274

(51) Int. Cl.
*H01Q 1/38* (2006.01)
(52) U.S. Cl. ................................ 343/700 MS; 343/702; 343/895
(58) Field of Classification Search .......... 343/700 MS, 343/850, 860; 340/572.7
See application file for complete search history.

(56) References Cited

U.S. PATENT DOCUMENTS

| 6,028,564 | A | 2/2000 | Duan et al. |
| 6,215,402 | B1 | 4/2001 | Rao Kodukula et al. |
| 6,285,342 | B1 | 9/2001 | Brady et al. |
| 6,535,175 | B2 | 3/2003 | Brady et al. |
| 7,486,192 | B2 | 2/2009 | Yamagajo et al. |
| 7,557,757 | B2 * | 7/2009 | Deavours et al. ...... 343/700 MS |
| 2006/0208955 | A1 | 9/2006 | Kai et al. |
| 2009/0140947 | A1 * | 6/2009 | Sasagawa et al. .......... 343/845 |

FOREIGN PATENT DOCUMENTS

| JP | 2006-295879 | 10/2006 |
| JP | 2007-228437 | 9/2007 |
| KR | 10-2007-0088228 A | 8/2007 |

OTHER PUBLICATIONS

Byunggil Yu et al., "RFID Antenna Using Two-Shorted Microstrip Patches Mountable on Metallic Objects", Microwave and Optical Technology Letters, vol. 49, No. 2, Feb. 2007, pp. 414-416.

* cited by examiner

*Primary Examiner*—Hoang V Nguyen
(74) *Attorney, Agent, or Firm*—Jae Y. Park; Kile Goekjian Reed & McManus

(57) ABSTRACT

An antenna for an RFID tag having an RFID tag chip includes a dielectric material, a radiating patch radiating a signal from the RFID tag chip, and a feed line supplying power to the RIFD tag chip through magnetic-coupling with the radiating patch. Accordingly, a small antenna that can be attached to metal can be realized.

8 Claims, 7 Drawing Sheets

ANTENNA FOR RADIO FREQUENCY IDENTIFICATION TAG

CROSS-REFERENCE TO RELATED APPLICATION

This application claims priority to and the benefit of Korean Patent Application No. 10-2007-0102274 filed in the Korean Intellectual Property Office on Oct. 10, 2007, the entire contents of which are incorporated herein by reference.

BACKGROUND OF THE INVENTION (a) Field of the Invention

The present invention relates to an antenna for a radio frequency identification (RFID) tag.

The present invention was supported by the IT R&D program of MIC/IITA [2006-S-023-02, Development of Advanced RFID System Technology].

(b) Description of the Related Art

A radio frequency identification (RFID) tag is used in various fields such as distribution and material handling industries, together with an RFID reader.

When an object to which the RFID tag is attached accesses a read zone of the RFID reader, the RFID reader transmits an interrogation signal to the RFID tag by modulating an RF signal having a specific frequency, and the RFID tag responds to the interrogation of the RFID reader.

That is, the RFID reader transmits an interrogation signal to the RFID tag by modulating a continuous electromagnetic wave having a specific frequency, and the RFID tag transmits back the electromagnetic wave transmitted from the RFID reader after performing back-scattering modulation in order to transmit its own information stored in the RFID tag's internal memory. The back-scattering modulation is a method for transmitting tag information by modulating the amplitude and/or the phase of a scattered electromagnetic wave when the RFID tag transmits the electromagnetic wave that is initially transmitted from the RFID reader back to the RFID reader by scattering the electromagnetic wave.

Since a passive RFID tag does not include a separate operation power source, it rectifies the electromagnetic wave transmitted from the RFID reader and uses the rectified electromagnetic wave as its own power source to acquire operation power. The intensity of the electromagnetic wave transmitted from the RFID reader should be larger than a specific threshold value for normal operation. However, since the transmission power of the reader is limited by local regulations of each country, it is not possible to unconditionally raise the level of transmission power.

Therefore, the RFID tag should efficiently receive the electromagnetic wave transmitted from the RFID reader to extend the read zone without raising the transmission power level of the reader. A method for raising the receiving efficiency of the RFID tag is to perform complex conjugate matching of an antenna and a radio frequency (RF) front-end of the RFID tag chip so as to maximize the intensity of the signal received by the RFID tag.

A conventional RFID tag will be described in detail with reference to FIG. 1.

FIG. 1 is a configuration of a conventional RFID tag.

As shown in FIG. 1, the RFID tag includes an RFID tag chip 10 and an RFID tag antenna 20 (hereinafter referred to as "an RFID tag antenna") for an RFID tag.

The RFID tag chip 10 stores information on an object to which the RFID tag is attached, and modulates the amplitude and/or the phase of an electromagnetic wave transmitted from an RFID reader for transmitting the information of the object. The RFID tag chip 10 modulates the amplitude and/or the phase of the wave by controlling the amount of power through input impedance, and includes an RF front-end that has input impedance.

The RFID tag antenna 20 scatters the electromagnetic wave that is modulated by the RFID tag chip 10. The RFID tag antenna 20 includes a dielectric material 21, a feed loop 23, radiating patches 25, and shorting plates 27.

The dielectric material 21 is rectangular-shaped with a relatively low dielectric constant, and a bottom surface of the dielectric material 21 is a ground surface that contacts the object.

The feed loop 23 is formed in an upper surface of the dielectric material 21, and is electrically connected to the RFID tag chip 10 so as to supply power thereto.

Each of the radiating patches 25 is formed in the upper surface of the dielectric material 21, and excites a current having an out-of-phase characteristic by using a current flowing through the feed loop 23 and radiates the excited current.

Each of the shorting plates 27 is formed on a part of a side of the dielectric material 21 and connects the radiating patches and the ground surface. That is, the shorting plates disconnect the radiating patches 25 and the ground surface.

Generally, in an RFID system including an RFID tag and an RFID reader, transmission power of the RFID reader is limited by local regulations of each country. Therefore, in order to extend a read zone of the RFID reader, the RFID tag antenna should have high efficiency, the RFID tag should resonate at a corresponding frequency, and the RFID tag antenna and the RF front-end of the RFID tag chip should be complex-conjugate matched.

However, the conventional RFID tag shown in FIG. 1 is not provided with a method for controlling impedance-matching of RFID tag chips that have various impedance characteristics.

Further, there are difficulties in miniaturizing the RFID tag antenna and reducing cost.

SUMMARY OF THE INVENTION

The present invention has been made in an effort to realize a small antenna for a radio frequency identification (RFID) tag, and provides a RFID tag that can be attached to a metal material.

To achieve the above-described objects, according to one exemplary embodiment of the present invention, an antenna is for antenna for a radio frequency identification (RFID) tag having a RFID tag chip, and includes a dielectric material, a radiating patch, and a feed loop. The dielectric material includes a first side that is adjacent to an object, a second side that is parallel with the first side, and a third side that connects the first side and the second side. The radiating patch is formed in a part of the second side of the dielectric material, determines a resonance frequency of the antenna, and radiates a signal from the RFID tag chip. The feed line is formed in a meandering shape in a part of the second side, at the part adjacent to the third side, and has lateral ends magnetically coupled with the radiating patches for supplying power to the RFID tag chip.

The antenna further includes a shorting plate formed in a part of the third side. The shorting plate disconnects the radiating patch and the first side, and controls the magnetic coupling between the radiating patch and the feed line.

Impedance of the antenna is conjugate-matched with impedance of the RFID tag chip.

In this instance, a relative dielectric constant of the dielectric material is equal to and more than 20.

The feed line is divided into a first section extending in a meandering shape in a direction from an end of the feed line and a second section extending in a direction from an end of the first section. The second section has a terminal in which the RFID tag chip is formed.

A reactance component of the impedance of the antenna corresponds to a circumference length of the first section and the second section.

A resistance component of the impedance of the antenna corresponds to the size of the shorting plate.

The resonance frequency of the antenna corresponds to the size of the radiating patch.

BRIEF DESCRIPTION OF THE DRAWINGS

An exemplary embodiment of the present invention will be described in detail with reference to the accompanying drawings for clear understanding of advantages of the present invention, wherein.

DETAILED DESCRIPTION OF THE EMBODIMENTS

Figure 1:
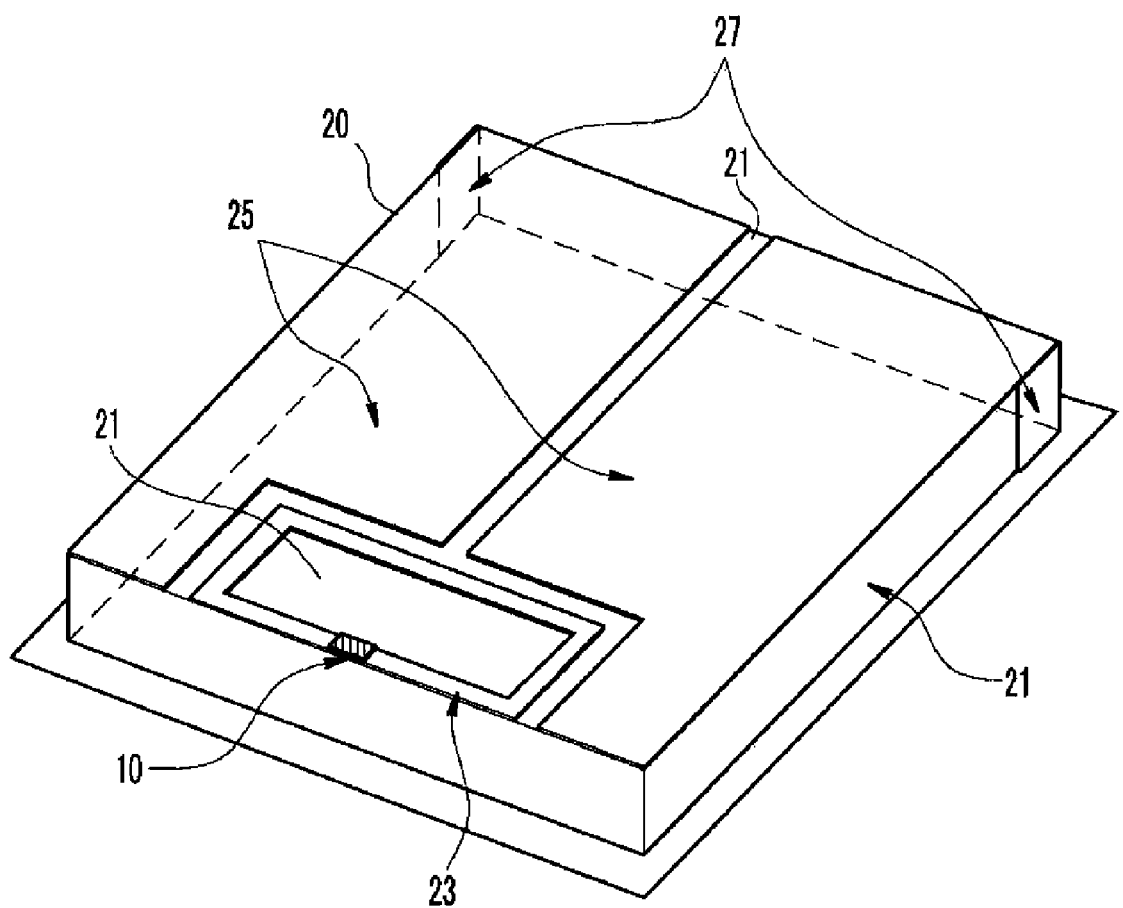
FIG. 1 is a configuration of a conventional radio frequency identification (RFID) tag.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements.

A radio frequency identification tag antenna according to an exemplary embodiment of the present invention will be described with reference to the drawings.

A radio frequency identification tag including a radio frequency identification tag antenna according to the exemplary embodiment of the present invention will be described with reference to FIG. 2 and FIG. 3.

Figure 2:
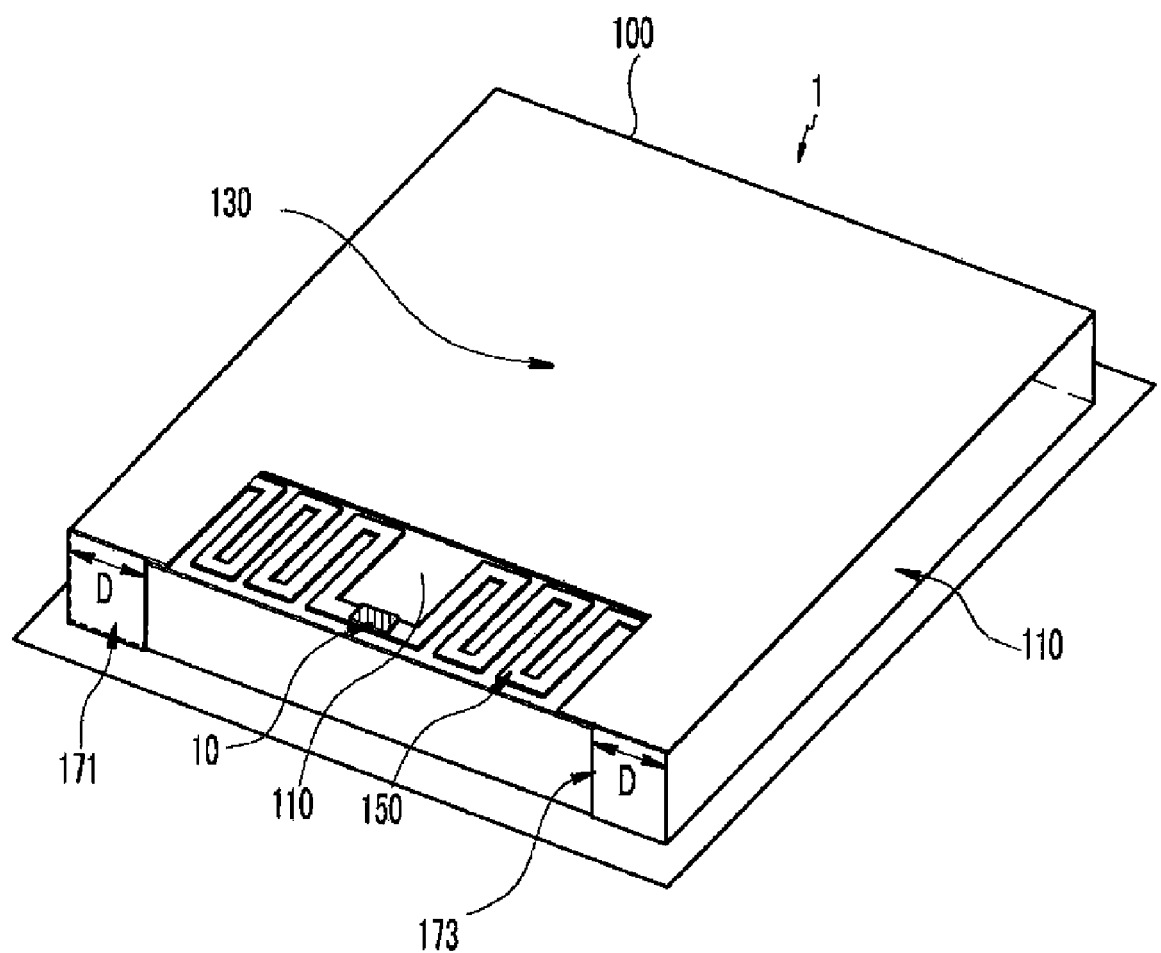
FIG. 2 is a configuration of an RFID tag according to an exemplary embodiment of the present invention.

FIG. 2 is a configuration of the radio frequency identification tag according to the exemplary embodiment of the present invention.

As shown in FIG. 2, the radio frequency identification (RFID) tag 1 includes a radio frequency identification (RFID) tag chip 10 and an antenna 100 (hereinafter, referred to as "an RFID tag antenna") for RFID tag 1.

The RFID tag chip 10 stores information on an object to which an RFID tag 1 is attached, and modulates the amplitude and/or the phase of electromagnetic waves transmitted from an RFID reader so as to transmit the object information. The RFID tag chip 10 may control the amount of power by using input impedance so as to modulate the amplitude and/or the phase of the electromagnetic waves, and may include an RF front-end having input impedance.

The RFID tag antenna 100 includes a dielectric material 110, a radiating patch 130, a feed line 150, and shorting plates 171 and 173, and receives radio frequency (RF) signals transmitted from the RFID reader.

The dielectric material 110 designed in a ceramic cuboid shape has a relative dielectric constant that is equal to and more than 20, and a bottom surface of the dielectric material 110 is a ground surface that contacts the object. According to the exemplary embodiment of the present invention, the RFID tag antenna 100 can be miniaturized by using a ceramic dielectric material 110.

The radiating patch 130 is formed on portons of an upper surface of the dielectric material 110, and for convenience in electromagnetic-coupling with the feed line 150, surrounds the microstrip lines 130 and 140 in a predetermined distance. Thereby, the electromagnetic-coupling is formed a space of the dielectric material 110 between the radiating patch 120 and the adjacent microstrip line 130 or 140.

The feed line 150 is formed on a part of the upper surface of the dielectric material 110 and is partially designed in a meandering shape, and is electrically connected to the RFID tag chip 10 for supplying power thereto. In order to minimize a feed length, lateral ends of the feed line 150 are connected with the radiating patch 130.

The feed lines 130 and 140 of the RFID tag antenna 100 according to the exemplary embodiment of the present invention will be described in detail with reference to FIG. 3.

Figure 3:
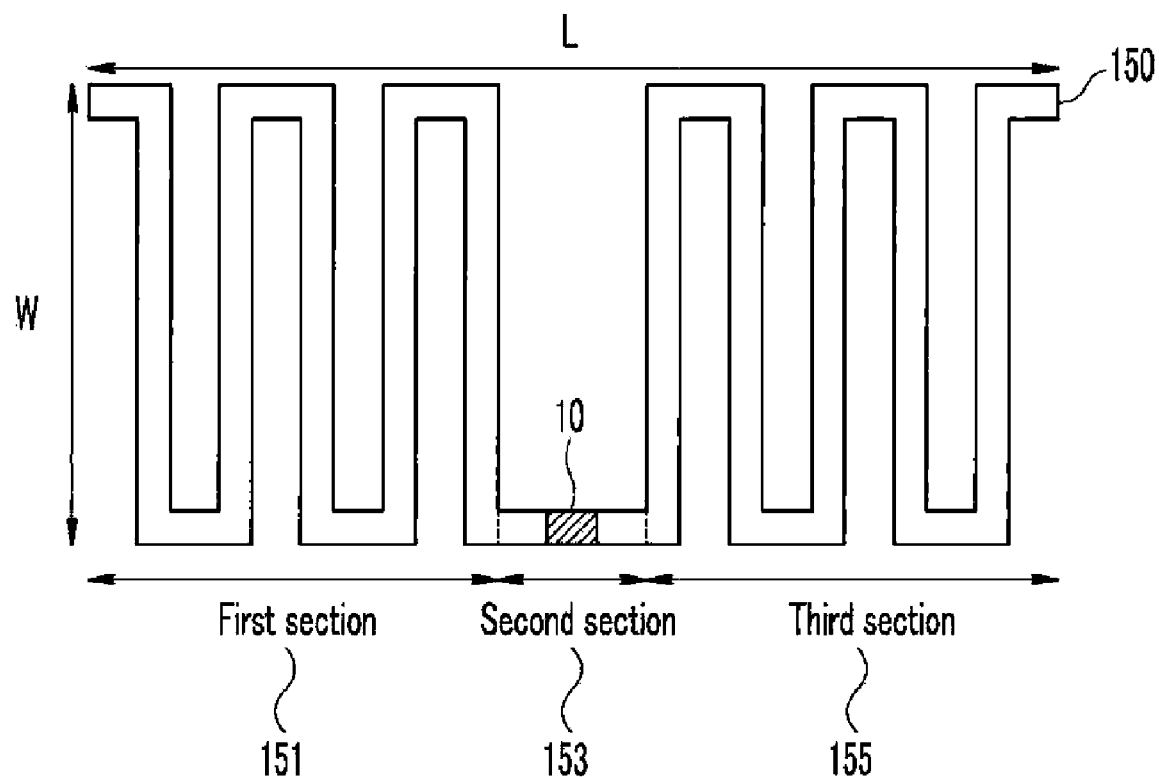
FIG. 3 is a configuration of a feed line of an RFID tag antenna according to the exemplary embodiment of the present invention.

FIG. 3 shows a structure of the feed line of the RFID tag antenna according to the exemplary embodiment of the present invention.

As shown in FIG. 3, the feed line 150 of the RFID tag antenna according to the exemplary embodiment of the present invention is divided into a first section 151, a second section 153, and a third section 155, and has a horizontal length L and a vertical length W.

The first section 151 extends in a meandering shape in the rightward direction of the feed line 150 from a left end point of the feed line 150.

The second section 153 straightly extends in the rightward direction from an end point of the first section 151, and the RFID tag chip 10 is superimposed in a center portion of the second section 153.

The third section 155 extends in a meandering shape to a right end point of the feed line 150 from a right end point of the second section 153.

The RFID tag including the RFID tag antenna according to the exemplary embodiment of the present invention will be described in detail with reference to FIG. 2.

Each of the shorting plates 171 and 173 is formed on a part of a side close to the RFID tag chip 10 among four sides of the dielectric material 110, and connects/disconnects the radiating patch 130 and the ground. Each of the shorting plates 171 and 173 has the same horizontal length D and the same size.

In this instance, the radiating patch 130 and the feed line 150 are magnetically coupled with each other, and the magnetic-coupling serves as an impedance transformer in the RFID tag antenna 100.

The RFID tag antenna 100 according to the exemplary embodiment of the present invention can control a resistance component of impedance of the RFID tag antenna 100 by changing the horizontal length D of each of the shorting plates 171 and 173, that is, the size of each of the shorting plates 171 and 173.

In addition, the RFID tag antenna 100 according to the exemplary embodiment of the present invention can be designed to control a reactance component of the impedance of the RFID tag antenna 100 by changing the horizontal length L and the vertical length W of the feed line 150, that is, the circumference length of the feed line 150.

Further, the RFID tag antenna 100 according to the exemplary embodiment of the present invention can be designed to be resonated at a resonance frequency by changing the size of the radiating patch 130.

An equivalent circuit of the RFID tag antenna and the RF front-end of the is RFID tag chip according to the exemplary embodiment of the present invention will be described with reference to FIG. 4.

Figure 4:
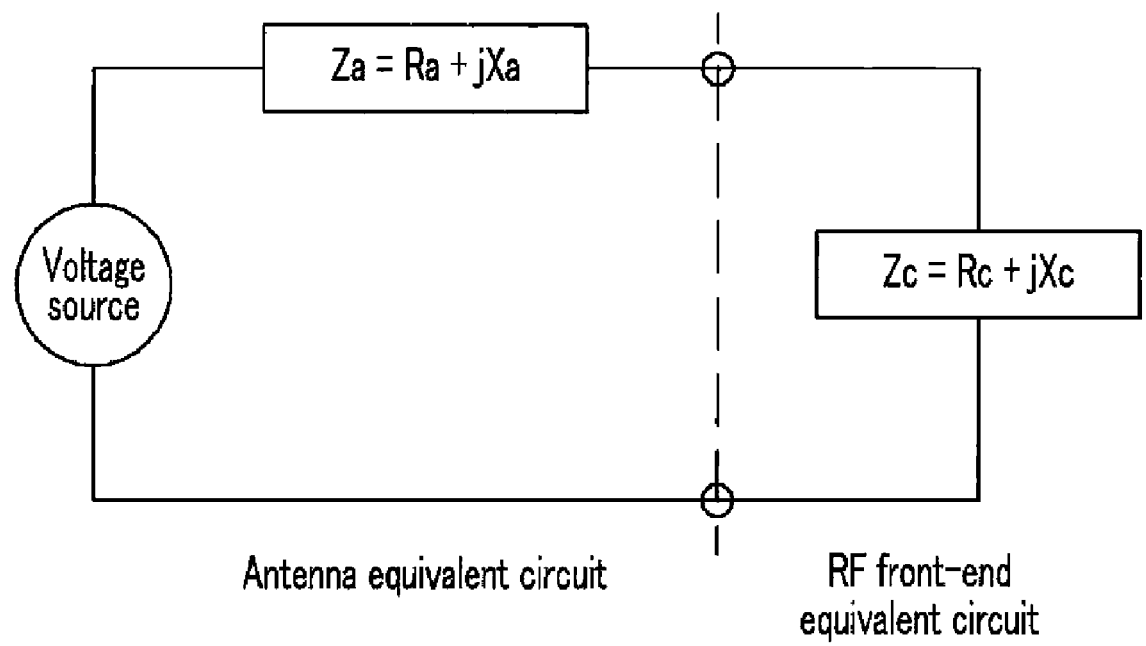
FIG. 4 shows an equivalent circuit of the RFID tag antenna and a radio frequency (RF) front-end according to the exemplary embodiment of the present invention.

FIG. 4 shows an equivalent circuit of the RFID tag antenna and the RF front-end of the RFID tag chip according to the exemplary embodiment of the present invention.

As shown in FIG. 4, the equivalent circuit includes a voltage source, impedance of the RFID tag antenna 100, and impedance of the RF front-end. The voltage source and the impedance $Z_a$ of the RFID tag antenna 100 form an equivalent circuit of the RFID tag antenna 100, and the impedance $Z_c$ of the RF front-end of the RFID tag chip 10 forms an equivalent circuit of the RF front-end.

The impedance $Z_a$ of the RFID tag antenna 100 has a real part $R_a$ and an imaginary part $X_a$, and the impedance $Z_c$ of the RF front-end has a real part $R_c$ and an imaginary part $X_c$.

The RFID tag antenna 100 transmits the maximum power to the RF front-end of the RFID tag chip 10 by conjugate-matching the impedance $Z_a$ of the RFID tag antenna 100 and the impedance $Z_c$ of the RF front-end as shown in Equation 1.

$R_a = R_c$ $X_a = -X_c$ [Equation 1]

A general impedance value of the RF front-end is about 50Ω, but in the exemplary embodiment of the present invention, the impedance of the RF front-end has a random complex value. That is, the impedance $Z_c$ of the RF front end has a small resistance component $R_c$ and a large capacitive reactance component $X_c$. Therefore, the impedance $Z_a$ of the antenna should have a small resistance component $R_a$ and a large inductive reactance component $X_a$ and should simultaneously resonate at a corresponding frequency.

The impedance $Z_a$ of the RFID tag antenna 100 can be designed to have a small resistance component $R_a$ by changing the size of the respective shorting plates 171 and 173.

In addition, according to the exemplary embodiment of the present invention, the impedance $Z_a$ of the RFID tag antenna 100 can be designed to have a large inductive reactance component $X_a$ by changing the length of the feed line 150.

Further, according to the exemplary embodiment of the present invention, the RFID tag antenna 100 can be designed to be resonated at a resonance frequency by changing the size of the radiating patch 130.

Figure 5:
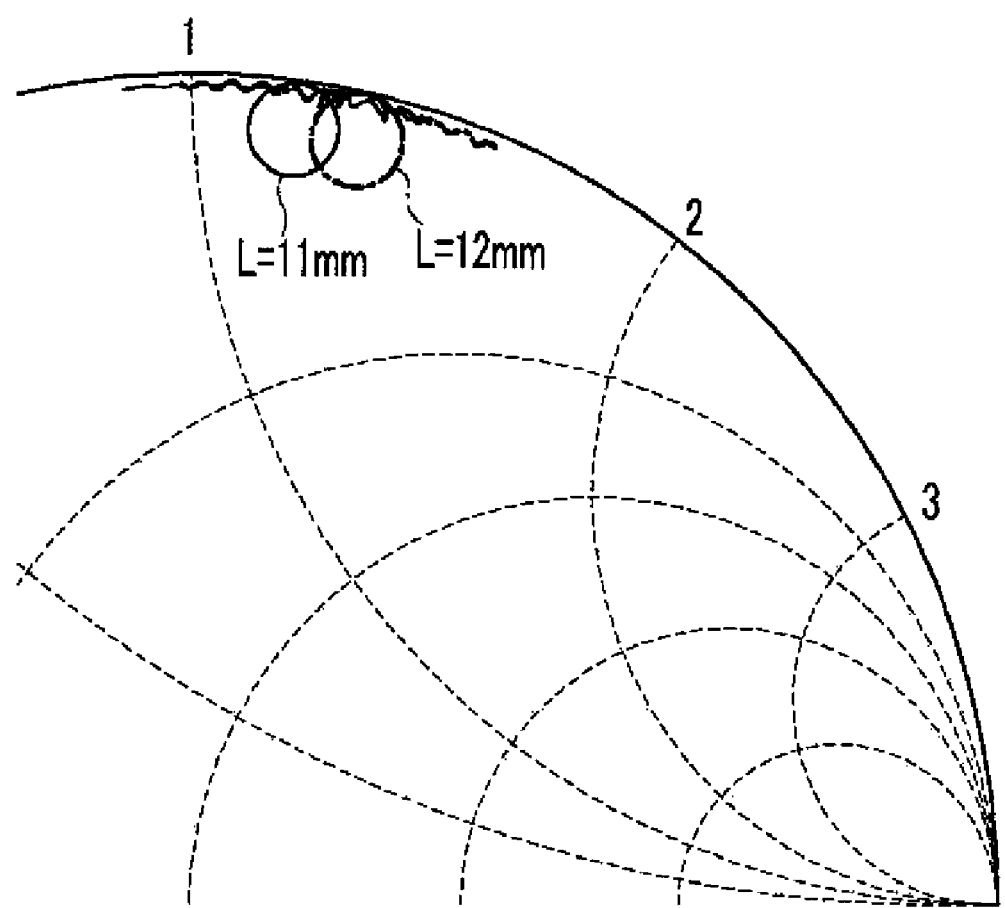
FIG. 5 shows impedance variation of the TFID tag antenna with change of a circumference length of the feed line according to the exemplary embodiment of the present invention.
Figure 6:
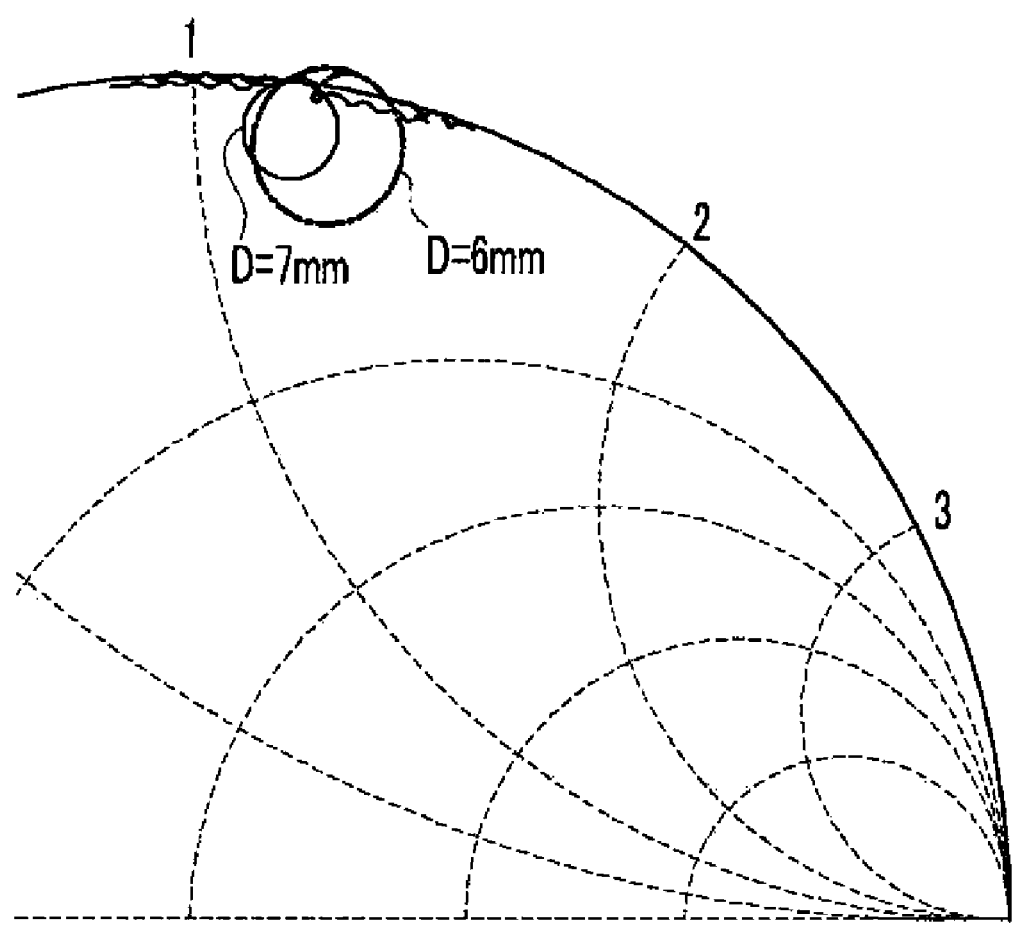
FIG. 6 shows impedance variation with change of an area of a shorting plate according to the exemplary embodiment of the present invention.

With reference to FIG. 5 and FIG. 6, impedance variation of the RFID tag antenna according to the exemplary embodiment of the present invention will be described in detail.

FIG. 5 shows impedance variation with change of the circumference length of the feed line according to the exemplary embodiment of the present invention. In FIG. 5, variation of the impedance $Z_a$ of the RFID tag antenna 100 with change of the circumference length of the feed line 150, that is, the horizontal length L of the feed line 150, is plotted on a Smith chart.

As shown in FIG. 5, when the horizontal length L of the feed line 150 is changed from about 11 mm to about 12 mm, the resistance component $R_a$ of the impedance $Z_a$ of the RFID tag antenna 100 is maintained in an almost constant level but the reactance component $X_a$ of the impedance $Z_a$ of the RFID tag antenna 100 is increased.

FIG. 6 shows impedance variation with change of the size of the shorting plate according to the exemplary embodiment of the present invention. In FIG. 6, the impedance $Z_a$ of the RFID tag antenna 100 that varies with change of the size of each of the shorting plates 171 and 173, that is, the horizontal length D of each of the shorting plates 171 and 173, is plotted on the Smith chart.

As shown in FIG. 6, when the horizontal length D of each of the shorting plates 171 and 173 is changed from about 6 mm to about 7 mm, the reactance component $X_a$ of the impedance $Z_a$ of the RFID tag antenna 100 is maintained in an almost constant level but the resistance component $R_a$ of the impedance $Z_a$ of the RFID tag antenna 100 is increased.

An operation bandwidth of the RFID tag antenna with reference to a return loss between the RFID tag antenna and the RFID tag chip according to the exemplary embodiment of the present invention will be described with reference to FIG. 7.

Figure 7:
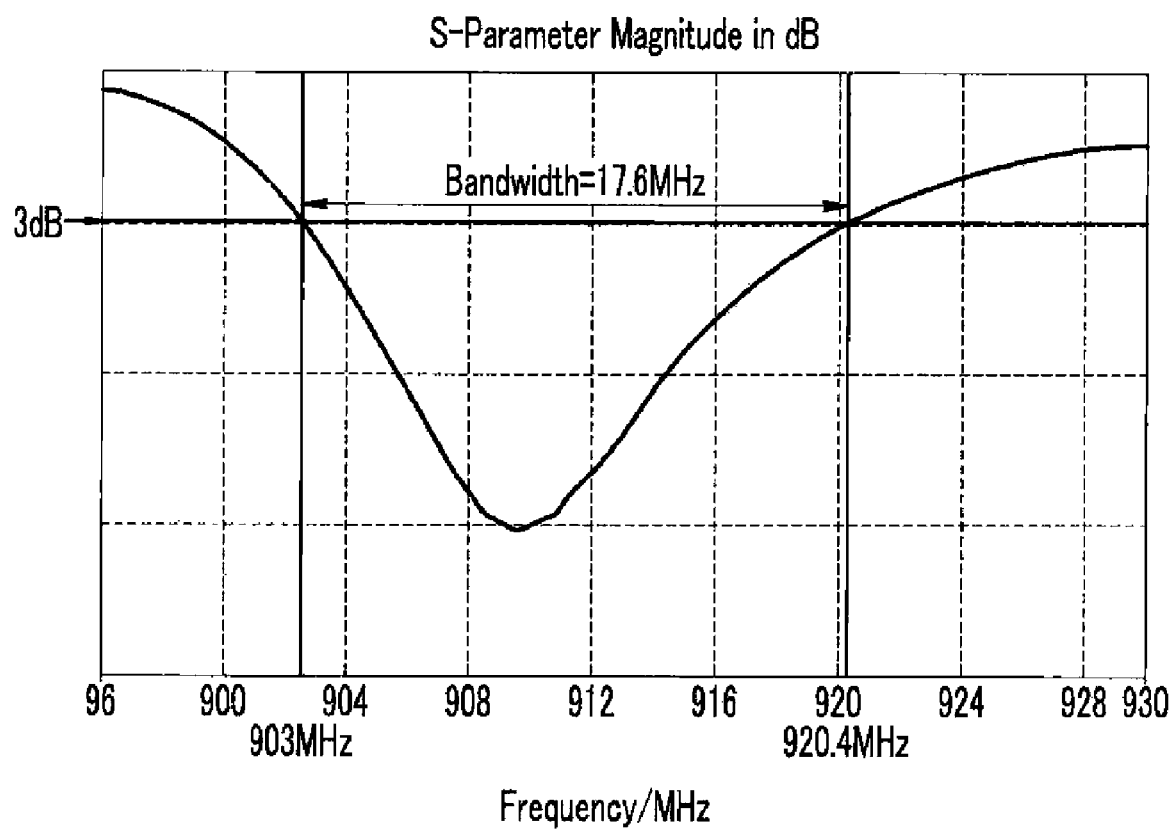
FIG. 7 shows a return loss of the RFID tag according to the exemplary embodiment of the present invention.

FIG. 7 shows a return loss of the RFID tag according to the exemplary embodiment of the present invention. In this instance, the volume of the RFID tag antenna 100 is about 25 mm×25 mm×3 mm, and the ceramic dielectric material 110 of the RFID tag antenna 100 has a relative dielectric constant of 48.

As shown in FIG. 7, when a reference return loss between the RFID tag antenna 100 and the RFID tag chip 10 is about 3 dB, the operation bandwidth of the RFID tag antenna 100 is about 17.6 MHz.

According to the exemplary embodiment of the present invention, a small RFID tag antenna can be realized, an RFID tag that can be attached to a metal material can be realized, and an RFID tag antenna that can be efficiently matched with an RFID tag chip by controlling impedance of the RFID tag antenna can be realized.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An antenna for a radio frequency identification (RFID) tag having a RFID tag chip, the antenna comprising:

a dielectric material having a first side that is adjacent to an object, a second side that is parallel with the first side, and a third side that connects the first side and the second side;

a radiating patch formed on a part of the second side, determining a resonance frequency of the antenna, and radiating a signal from the RFID tag chip; and a feed line formed in a meandering shape in a part of the second side, the part being adjacent to the third side, and having lateral ends magnetically coupled with the radiating patch for supplying power to the RFID tag chip.

2. The antenna of claim 1, further comprising a shorting plate formed in a part of the third side, disconnecting the radiating patch and the first side, and controlling the magnetic-coupling between the radiating patch and the feed line.

3. The antenna of claim 2, wherein impedance of the antenna is conjugate-matched with impedance of the RFID tag chip.

4. The antenna of claim 3, wherein the dielectric material has a relative dielectric constant equal to and more than 20.

5. The antenna of claim 4, wherein a resistance component of the impedance of the antenna corresponds to the size of the shorting plate.

6. The antenna of claim 4, wherein the resonance frequency of the antenna corresponds to the size of the radiating patch.

7. The antenna of claim 1, wherein the feed line comprises
a first section extending in a meandering shape from an end of the feed line and
a second section extending to a direction from an end of the first section and having a terminal in which the RFID tag chip is formed.

8. The antenna of claim 7, wherein a reactance component of the impedance of the antenna corresponds to a circumference length of the first section and second section.

* * * * *